US009237255B1

(12) United States Patent
Gopalkrishnan et al.

(10) Patent No.: US 9,237,255 B1
(45) Date of Patent: Jan. 12, 2016

(54) METHODS AND SYSTEMS FOR PROCESSING DOCUMENTS (71) Applicant: Xerox Corporation, Norwalk, CT (US)

(72) Inventors: Sainarayanan Gopalkrishnan, Chennai (IN); Xing Li, Webster, NY (US); Rajasekar Kanagasabai, Chennai (IN); Vignesh Doss, Tamil Nadu (IN); Clara Cuciurean-Zapan, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/467,303

(22) Filed: Aug. 25, 2014

(51) Int. Cl.
*H04N 1/04* (2006.01)
*H04N 1/40* (2006.01)

(52) U.S. Cl.
CPC .................................. *H04N 1/40068* (2013.01)

(58) Field of Classification Search
CPC .................................................. H04N 1/40068
USPC .................................... 358/2.1, 1.11, 474, 1.9
See application file for complete search history.

(56) References Cited

U.S. PATENT DOCUMENTS

| 5,384,864 | A | 1/1995 | Spitz | |
|---|---|---|---|---|
| 7,894,683 | B2 | 2/2011 | Nagarajan et al. | |
| 8,086,050 | B2 | 12/2011 | Schwartz et al. | |
| 2002/0036788 | A1* | 3/2002 | Hino | G06F 17/214 358/1.11 |
| 2002/0048032 | A1* | 4/2002 | Ichikawa | H04N 1/3875 358/1.11 |
| 2006/0062453 | A1* | 3/2006 | Schacht | 382/164 |
| 2013/0194277 | A1* | 8/2013 | Takishima | 345/472 |

* cited by examiner

*Primary Examiner* — Houshang Safaipour (57) ABSTRACT

Various embodiments for methods and systems for processing a document are disclosed. A font size associated with each of one or more text regions included in the document is determined. A first resolution of each of the one or more text regions is modified based on respective font size associated with each of the one or more text regions to generate a multi-resolution document.

17 Claims, 4 Drawing Sheets

METHODS AND SYSTEMS FOR PROCESSING DOCUMENTS

TECHNICAL FIELD

The presently disclosed embodiments are related, in general, to processing of documents. More particularly, the presently disclosed embodiments are related to methods and systems for processing the documents to generate a multi-resolution document.

BACKGROUND

Mixed Raster Content (MRC) based scanning is widely used to compress documents to reduce file size. For example, during scanning of printed documents, the users may specify a resolution (e.g., in the form of dpi), and subsequently, the scanned documents may be compressed using the specified resolution. The documents being scanned may include both, image regions and text regions. Typically, the text regions in the scanned documents are compressed using same resolution value specified by the user, whereas the image regions are compressed using half of the resolution specified by the user. For example, if the user specifies a resolution of 200 dpi during the scanning, the text regions included in the scanned documents are compressed with the resolution value of 200 dpi, whereas the image regions included in the scanned documents are compressed with the resolution value of 100 dpi.

However, the documents being scanned may include the text regions that include content with varying font sizes. In such scenarios, modifying the resolution indiscriminately (i.e., same resolution for text of different font sizes) in such documents may hamper the readability of the document.

SUMMARY

According to embodiments illustrated herein, there is provided a method for processing a document comprising one or more text regions. The method includes determining a font size associated with each of said one or more text regions. The method further includes modifying a first resolution of each of said one or more text regions, based on respective font size associated with each of said one or more text regions to generate a multi-resolution document. The method is performed by one or more processors.

According to embodiments illustrated herein, there is provided a system for processing a document comprising one or more text regions. The system includes one or more processors operable to determine a font size associated with each of said one or more text regions. The one or more processors are further operable to modify a first resolution of each of said one or more text regions, based on respective font size associated with each of said one or more text regions to generate a multi-resolution document.

According to embodiments illustrated herein, there is provided a computer program product for use with a computer. The computer program product includes a non-transitory computer readable medium. The non-transitory computer readable medium stores a computer program code for processing a document comprising one or more text regions. The computer program code is executable by one or more processors to determine a font size associated with each of said one or more text regions. The computer program code is further executable by the one or more processors to modify a first resolution of each of said one or more text regions, based on respective font size associated with each of said one or more text regions to generate a multi-resolution document.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "computing device" refers to a device including a processor/microcontroller and/or any other electronic component, or a device or a system that performs one or more operations according to one or more programming instructions. Examples of the computing device may include, but are not limited to, a desktop computer, a laptop, a PDA, a mobile device, a multifunctional device (MFD), a smartphone, a tablet computer (e.g., iPad®, and Samsung Galaxy Tab®), and the like.

An "MFD" refers to a computing device that can perform multiple functions. Examples of the functions may include, but are not limited to, printing, scanning, copying, faxing, emailing, and the like. In an embodiment, the MFD includes a scanner and a printer for scanning and printing one or more documents, respectively. In an embodiment, the MFD has communication capabilities that enable the MFD to send/receive data and messages in accordance with one or more communication protocols such as, but not limited to, HTTP, FTP, WebDAV, E-mail, SMB, NFS, and TWAIN.

A "document" refers to a collection of content, where the content may correspond to image content, or text content retained in at least one of an electronic form or a printed form. Each of the electronic form or the printed form may include one or more pictures, symbols, text, line art, blank, or non-printed regions, etc. In an embodiment, the electronic document may be obtained by scanning a corresponding printed document. Further, the electronic document may be stored in various file formats, such as, JPG or JPEG, GIF, TIFF, PNG, BMP, RAW, PSD, PSP, PDF, and the like. In an embodiment, the text content in the document may be included in the one or more text regions and the image content may be included in the one or more image regions in the document. Further, each of the one or more text regions may have an associated font size that depicts the dimensions of the text content included in the corresponding text region.

A "resolution" refers to a measure of proximity of pixels in the document. In an embodiment, the resolution may correspond to number of pixels available in a unit size (e.g., per square inch) of the document. Further, the resolution of the document may be representative of the displayed clarity of the content included in the document. The resolution may be measured in different ways, such as, but not limited to, lines per inch, line per mm, dots per inch (dpi), etc.

A "multi-resolution document" refers to a document that has different resolutions in different parts of the document. In an embodiment, the document may include one or more text regions and image region, such that each of the one or more text regions and the image region has an associated resolution with it. Further, the resolution of the image region may be different from the resolution of the one or more text regions.

A "file-size" refers to a memory space occupied by a file (e.g., a document) in the computing device. The file-size may be determined in different ways, such as, but not limited to, bytes (Bs), kilobytes (KBs), megabytes (MBs), and the like.

Figure 1:
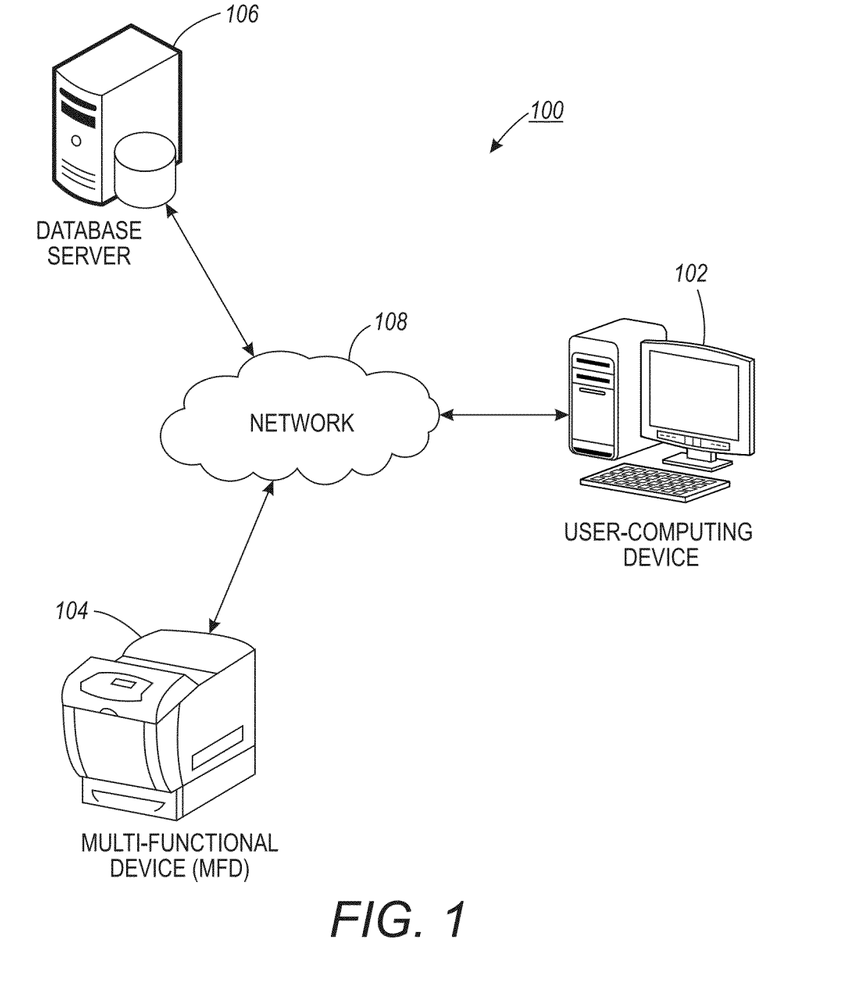
FIG. 1 is a block diagram illustrating a system environment in which various embodiments may be implemented.

FIG. 1 is a block diagram illustrating a system environment 100 in which various embodiments may be implemented. The system environment 100 includes a user-computing device 102, an MFD 104, a database server 106, and a network 108. Various devices in the system environment 100 (e.g., the user-computing device 102, the MFD 104, and the database server 106) may be interconnected over the network 108.

The user-computing device 102 refers to a computing device used by a user. In an embodiment, the user may utilize the user-computing device 102 to instruct the MFD 104 for scanning one or more printed documents. In an embodiment, the user may specify a resolution value that may be used for processing the scanned document. For example, the resolution specified by the user may be used to modify a resolution of the scanned document. The user may specify the resolution value through the input devices (e.g. keyboard, mouse, and touch-interface) associated with the user-computing device 102. Further, the user-computing device 102 may receive the processed document from the MFD 104. The user-computing device 102 may include various types of computing devices, such as, but not limited to, a desktop computer, a laptop, a personal digital assistant (PDA), a mobile device, a smartphone, a tablet computer (e.g., iPad® and Samsung Galaxy Tab®), and the like.

The MFD 104 refers to a computing device that processes the one or more documents. In an embodiment, the MFD 104 scans the one or more printed documents to generate corresponding scanned documents. Further, the MFD 104 modifies the resolution of the scanned document in accordance with the resolution value received from the user-computing device 102. In an embodiment, the MFD 104 may receive the resolution value from a user through a user-interface provided on a display associated with the MFD 104. Prior to modifying the resolution, the MFD 104 may identify an image region and one or more text regions in the scanned document. In an embodiment, the MFD 104 may modify the resolution associated with each of the one or more text regions and the image region in the scanned document. The MFD 104 may determine an expected resolution value to modify the resolution of the text regions. Based on the modified resolution of the image region and the text regions, the MFD 104 may generate a multi-resolution document. Further details about modifying the resolution of the scanned document to generate the multi-resolution document have been discussed in conjunction with the FIG. 3. The MFD 104 may correspond to various types of computing devices, such as, but not limited to, printers, scanners, copiers, fax-machines, desktop computers, laptops, PDAs, smartphones, mobile devices, tablet computers, and the like.

The database server 106 refers to a computing device that may store the documents to be processed, in accordance with at least one embodiment. In an embodiment, the database server 106 may store information pertaining to the processed documents. In an embodiment, the database server 106 may store a look-up table that includes the mapping between the expected resolution and the font sizes associated with the text region. In an embodiment, the database server 106 may receive a query from the MFD 104 to extract the look-up table. For querying the database server 106, one or more querying languages may be utilized such as, but not limited to, SQL, QUEL, DMX and so forth. Further, the database server 106 may be realized through various technologies such as, but not limited to, Microsoft® SQL server, Oracle, and My SQL. In an embodiment, the database server 106 may connect to the MFD 104, using one or more protocols such as, but not limited to, ODBC protocol and JDBC protocol.

It will be apparent to a person skilled in the art that the functionalities of the database server 106 may be incorporated into the MFD 104, without departing from the scope of the disclosure. In such a scenario, various types of information, as disclosed above, may be stored in the MFD 104.

The network 108 corresponds to a medium through which content and messages flow between various devices of the system environment 100 (e.g., the user-computing device 102, the MFD 104, and the database server 106). Examples of the network 108 may include, but are not limited to, a Wireless Fidelity (Wi-Fi) network, a Wide Area Network (WAN), a Local Area Network (LAN), or a Metropolitan Area Network (MAN). Various devices in the system environment 100 can connect to the network 108 in accordance with various wired and wireless communication protocols such as Transmission Control Protocol and Internet Protocol (TCP/IP), User Datagram Protocol (UDP), and 2G, 3G, or 4G communication protocols.

Figure 2:
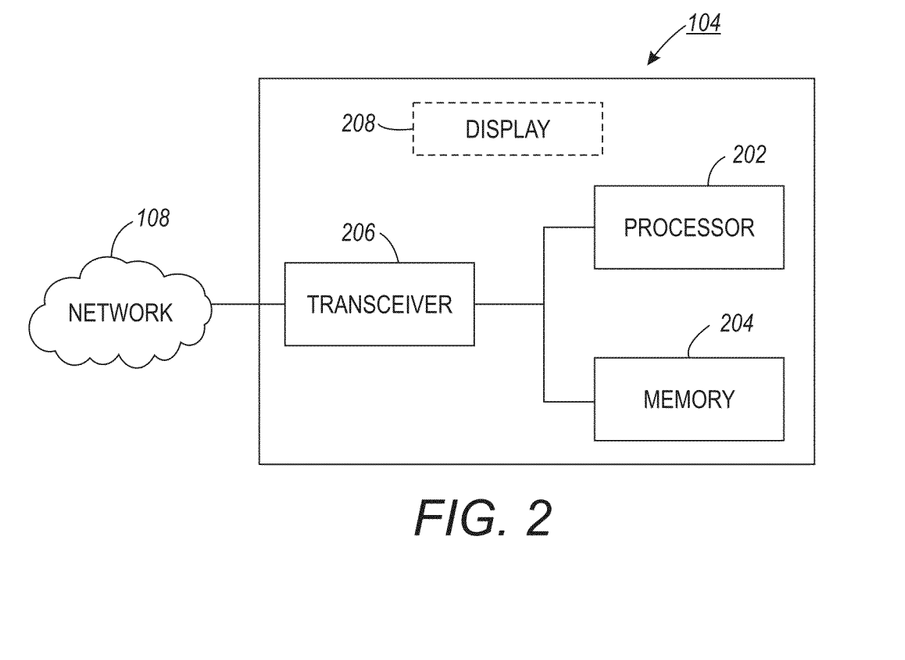
FIG. 2 is a block diagram illustrating a multifunction device, in accordance with at least one embodiment.

FIG. 2 is a block diagram illustrating the MFD 104, in accordance with at least one embodiment. The MFD 104 includes a processor 202, a memory 204, a transceiver 206, and a display 208.

The processor 202 is coupled to the memory 204 and the transceiver 206. The processor 202 includes suitable logic, circuitry, and/or interfaces that are operable to execute one or more instructions stored in the memory 204 to perform a predetermined operation. The memory 204 may be operable to store the one or more instructions. The processor 202 may be implemented using one or more processor technologies known in the art. Examples of the processor 202 include, but are not limited to, an X86 processor, a RISC processor, an ASIC processor, a CISC processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It will be apparent to a person having ordinary skill in the art that the one or more instructions stored in the memory 204 enables the hardware of the MFD 104 to perform the predetermined operation.

The transceiver 206 transmits and receives messages and data to/from various components of the system environment 100. Examples of the transceiver 206 may include, but are not limited to, an antenna, an Ethernet port, an USB port or any other port that can be configured to receive and transmit data. The transceiver 206 transmits and receives data/messages in accordance with various communication protocols, such as, TCP/IP, UDP, and 2G, 3G, or 4G communication protocols.

The display 208 facilitates the user to view information presented on the MFD 104. Further, the display 208 may facilitate the user to interact with the MFD 104. In such a scenario, the display 208 may have the capability to receive an input from the user (e.g., through touch screen). For example, using the display 208, the user may specify the resolution value that is used for modifying the resolution of the scanned document. The display 208 may be realized through several known technologies, such as Cathode Ray Tube (CRT) based display, Liquid Crystal Display (LCD), Light Emitting Diode (LED)-based display, Organic LED display technology, and Retina Display technology. In an embodiment, the display 208 can be a touch screen that is operable to receive a user-input.

In an embodiment, the MFD 104 may include different components, such as, but not limited to printers, scanners, copiers, and the like. In an embodiment, the scanner included in the MFD 104 may scan a document to generate the scanned document. Thereafter, the processor 202 may process the scanned document as described below in conjunction with FIG. 3.

Figure 3:
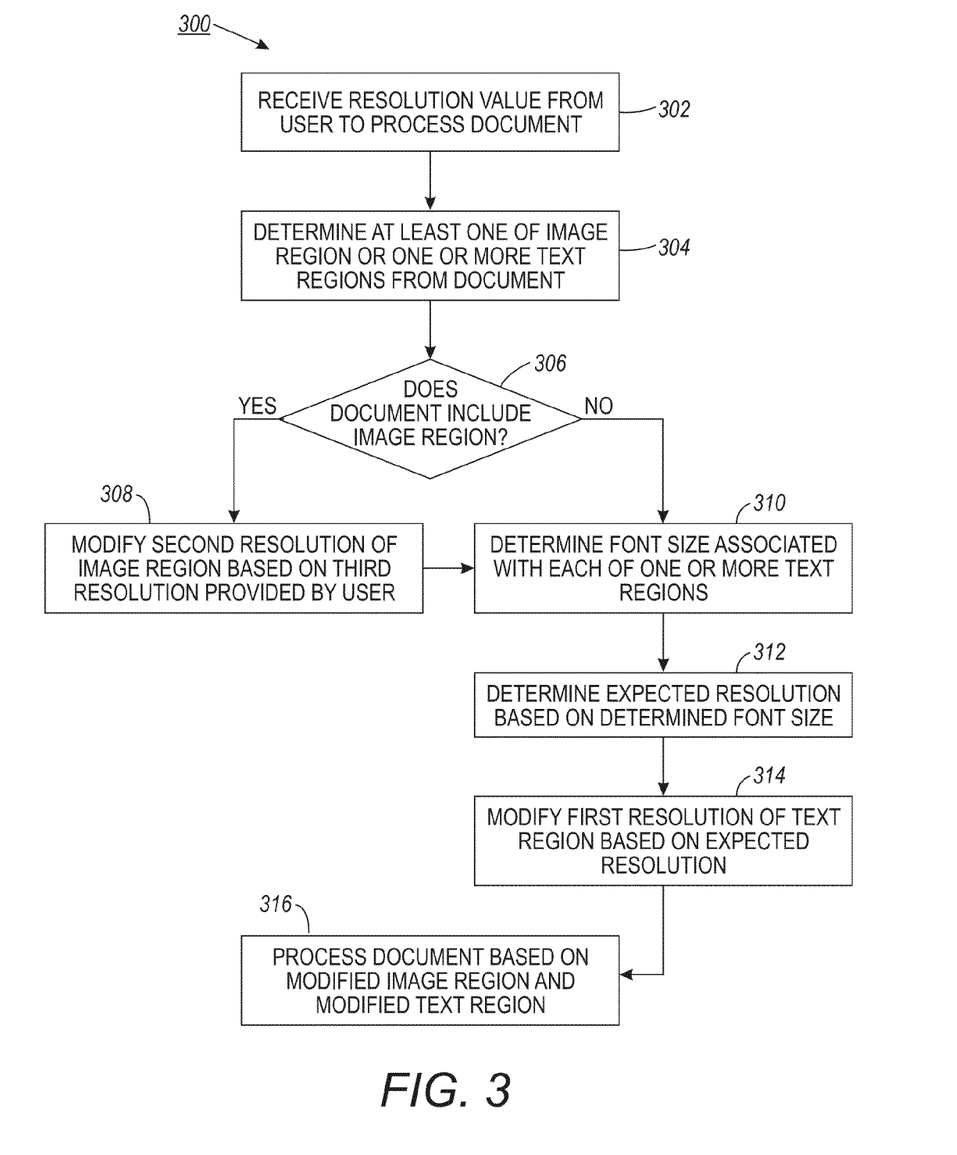
FIG. 3 is a flowchart illustrating a method for processing documents, in accordance with at least one embodiment.

FIG. 3 is a flowchart 300 illustrating a method for processing a scanned document, in accordance with at least one embodiment. The flowchart 300 is described in conjunction with FIG. 1 and FIG. 2.

At step 302, the resolution value to process the document is received from a user. As discussed, the user may utilize the user-computing device 102 to specify the resolution value. Further, the user may specify the resolution value through the user-interface provided on the display 208. In an embodiment, the processor 202 may retrieve the resolution value from the database server 106 to process the scanned document.

In an embodiment, the database server 106 may maintain a mapping between different users and corresponding resolution values specified by those users. In order to extract the resolution value, the processor 202 may transmit a query the database server 106, where the query may include identification of the user. The database server 106 may specify the resolution based on the identification of the user.

At step 304, the image region and the one or more text regions are determined in the scanned document. The processor 202 determines the image/text regions in the scanned document. In an embodiment, the scanned document may correspond to a previously stored electronic document in the database server 106. The processor 202 may determine the image/text regions from the scanned document based on image processing techniques known in the art. For example, the processor 202 may determine the image/text regions based on segmentation methods (e.g., connected components based segmentation). In such scenarios, the processor 202 may binarize the scanned document, and subsequently, may segment out the image regions and the text regions. In an embodiment, each of the one or more text regions has an associated font size. For example, the document may include three text regions with the font size of 8, 10, and 12. It will be apparent to a person skilled in the art that the scanned documents may include only text regions. In such cases, the processor 202 may determine different text regions included in the scanned document.

At step 306, it is determined whether the scanned document includes the image region. Based on the determination performed in step 304, the processor 202 may determine whether the scanned document includes the image region. If it is determined that the scanned document includes the image region, step 308 is performed, else step 310 is performed.

At step 308, the determined image region is modified. In an embodiment, the processor 202 modifies the resolution value associated with the image region based on the resolution value specified by the user (in conjunction with step 302). For example, if the resolution value of the image region included in the scanned document has the resolution value of 400 dpi, and if the user has specified a resolution value of 200 dpi, then the processor 202 may modify the resolution of the image region to 200 dpi. In an embodiment, the processor 202 modifies the resolution of the image region using know techniques such as MRC.

At step 310, the font size associated with each of the one or more determined text regions is determined. In an embodiment, the processor 202 may determine the font size based on the segmentation methods (e.g., connected components based segmentation). In an embodiment, single characters or group of characters included in the one or more text regions may be labeled as connected components and based on the size (e.g., height and/or width) of each of the connected components, font size associated with each of the one or more text regions may be determined. In an embodiment, the determined font size may be categorized in different size-categories (e.g., small, medium, and large). Table 1 illustrates three different text regions, as determined by the processor 202, along with associated font size and size-categories:

TABLE 1

Illustration of font size associated with three text regions

| Text Region | Font size | Size-category |
| --- | --- | --- |
| Text region - 1 | 8-9 | Medium |
| Text region - 2 | 7 or smaller | Small |
| Text region - 3 | 10 or greater | Large |

It will be apparent to a person skilled in the art that the size-categorization of the text regions has been provided just for illustration purposes and the definition of the size-categories (e.g., based on the font sizes) may be configured by the user. For example, the user may configure that the font size between 4-5 will be categorized as "small" font size, font size between 6-7 will be categorized as "medium" font size, and the font size between 8-12 will be categorized as "large" font size.

At step 312, the expected resolution is determined that is used for modifying the one or more determined text regions. The processor 202 determines the expected resolution based on the look-up table that includes the mapping between the expected resolution and respective font size of the text region. In an embodiment, the look-up table may be stored in the database server 106, and the processor 202 may retrieve the expected resolution from the look-up table. Table 2 illustrates a look-up table as stored in the database server 106:

TABLE 2

Illustration of the look-up table

| Font size | Size-category | Expected resolution (dpi) |
| --- | --- | --- |
| 7 or smaller | Small | 600 |
| 8-9 | Medium | 300 |
| 10 or greater | Large | 200 |

As discussed in conjunction with step 310, the definition of the size-category may be configured by the user. In a similar way, the values of the expected resolution may also be configured by the user. For example, as depicted in Table 2, the user has configured that for the font size "7 or smaller" (i.e., "small" font size), the value of the expected resolution to be used for modifying the corresponding text region is 600 dpi. In an embodiment, the values of the expected resolution may automatically be determined by the processor 202 based on the font size, and may not require configuration through the user.

At step 314, the resolution of each of the one or more text regions is modified based on the expected resolution determined in previous step (i.e., step 312). In an embodiment, the processor 202 may modify the resolution of each of the one or more text regions while compressing the scanned document (e.g., through MRC) to generate the multi-resolution document. For example, if the scanned documents includes three text regions (refer Table 1) with three different font sizes, then the processor 202 may modify the resolution of each of the three text regions based on respective expected resolution (e.g., determined through the look-up table), resulting into three text regions with three different resolutions in the same document.

At step 316, the document is processed based on the modified image region and one or more modified text regions. In an embodiment, the processor 202 collates the modified image region and the one or more modified text regions such that the file size of the document is reduced. In an alternate embodiment, the processor 202 collates the modified image region and the one or more modified text regions such that readability of the text content included in the one or more text regions is improved. Further illustration of the processing of the document, as disclosed in various steps above, has been provided in conjunction with FIG. 4.

In an embodiment, prior to processing the scanned document, the processor 202 may display a preview to the user, where the preview may include the identified one or more text regions and the image region. The user may select the expected resolution for each of the one or more text regions and the image region separately. Thereafter, based on the selected resolution, the MFD 104 may process the scanned document such that the desired resolution of the one or more text region and the image region is achieved.

It will be understood by a person skilled in the art that the modification of the image region and the one or more text regions may be performed in different order than discussed above. For example, the processor 202 may first modify the one or more text regions and then may modify the image region, without limiting the scope of the disclosure.

Figure 4:
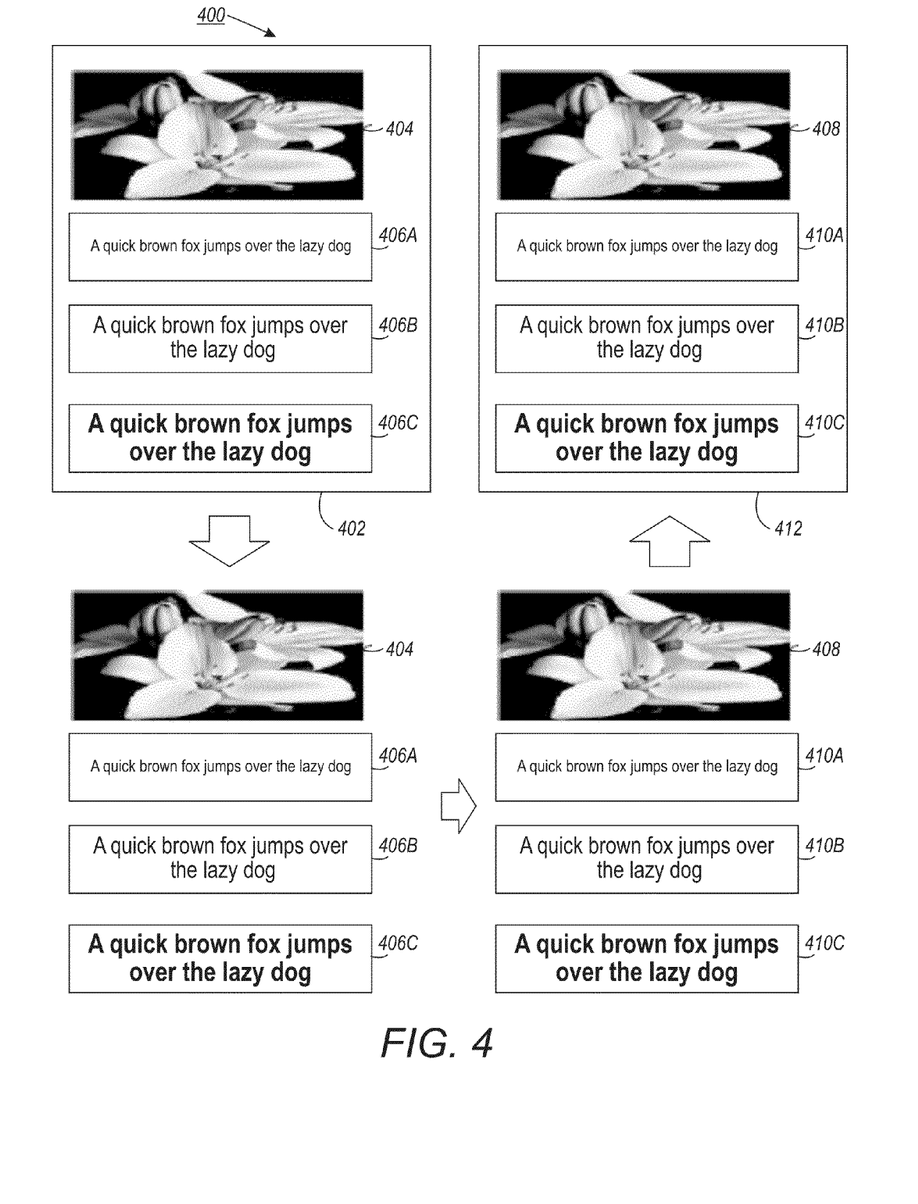
FIG. 4 is a flow diagram illustrating another method for processing documents, in accordance with at least one embodiment.

FIG. 4 is a flow diagram 400 illustrating the method for processing the document, in accordance with at least one embodiment. The flow diagram 400 includes a document 402, an image region 404, text regions 406*a-c*, modified image region 408, modified text regions 410*a-c*, and modified document 412. As discussed in conjunction with the FIG. 3, the document 402 may correspond to a scanned document corresponding to a printed document, or may correspond to an already stored electronic document. As depicted, the image region 404 includes image content and each of the text regions 406*a-c* includes text content. Further, the document 402 may have an associated resolution value. FIG. 4 now has been described in conjunction with FIG. 3.

In accordance with step 302, the resolution value to process the document 402 is received from the user. In an embodiment, the user specifies the resolution value of 200 dpi. As discussed in conjunction with step 302, the user may specify the resolution value through the user-computing device 102 or through the user-interface provided on the display 208 of the MFD 104. In an embodiment, the processor 202 may receive the resolution value through the database server 106.

In accordance with step 304, each of the image region 404, and the text regions 406*a-c* are extracted from the document 402. As depicted in the flow diagram 400 the processor 202 extracts the image region 404 and the text regions 406*a-c* from the document 402. Further details about the extraction of the image/text region from the scanned documents are already discussed in conjunction with step 304.

In accordance with step 306, it is determined whether the document 402 includes an image region. Since the document 402 includes the image region 404, the processor 202 performs step 308.

In accordance with step 308, the image region 404 is modified. As discussed in conjunction with step 308, the processor 202 may modify the image region 404 based on the resolution value specified by the user (i.e., 200 dpi). It will be apparent to a person skilled in the art that the resolution value used to modify the image region 404 may also be automatically be determined by the processor 202. For example, the processor 202 may modify the image region 404 with a resolution value that is half of the resolution value specified by the user. The processor 202 may generate the modified image region 408 by modifying the image region 404, as depicted in the flow diagram 400.

In accordance with the step 310, the font size associated with each of the text regions 406*a-c* is determined. As discussed in conjunction with FIG. 3, each of the text regions in the scanned document may have an associated font size. For example, the three text regions 406*a-c* may have three font sizes in the document 402. Table 3 illustrates the font sizes associated with the text regions 406*a-c* included in the document 402:

TABLE 3

Font size associated with the text regions in document 402

| Region | Font size |
|---|---|
| Text region 406a | 4 |
| Text region 406b | 8 |
| Text region 406c | 12 |

It will be apparent to a person skilled in the art that size categories (e.g., small, medium, and large) may also be associated with each of the text regions 406a-c, as discussed in conjunction with the FIG. 3.

In accordance with step 312, the processor 202 determines expected resolution corresponding to the text regions 406a-c that will be used for modifying the text regions 406a-c. In an embodiment, referring to Table 2 and Table 3, the processor 202 determines that the expected resolution for the text regions 406a (font size 4), text region 406b (font size 8), and text region 406 (font size 12) is 600 dpi, 300 dpi, and 200 dpi, respectively.

In accordance with the step 314, the processor 202 modifies the resolution of each of text regions 406a-c to generate the modified text regions 410a-c. That is, the processor 202 modifies the resolution of the text region 406a, 406b, and 406c to 600 dpi, 300 dpi, and 200 dpi, respectively to generate the modified text regions 410a, 410b, and 410c, respectively.

In accordance with the step 316, the modified image region 408 (with a modified resolution of 200 dpi) and one or more modified text regions 410a-c are collated to generate the modified document 412. As depicted in the flow diagram 400, the modified document 412 includes the modified image region 408 and the one or more modified text regions 410a-c. Further, the modified document 412 is such that it includes different resolutions in it. For example, as disclosed above, the resolution of the modified image region 408, and the modified text regions 410a-c are 200 dpi, 600 dpi, 300 dpi, and 200 dpi, respectively. Thus, the modified document 412 includes different regions with different resolutions.

It can be observed from the modified document 412 that if the font size of one of the text regions 406a-c is less (e.g., 4), then high resolution value (e.g., 600 dpi) is used for modifying that text region. Similarly, if the font size is high (e.g., 12) then low resolution (e.g., 200 dpi) is used for modifying that text region. Thus, if the font size is less, then readability is kept good (by keeping resolution value high), and if the font size is high, then the file size is optimized (by using low-resolution value) without compromising on the readability of the text.

The disclosed embodiments encompass numerous advantages. Typically, the scanned documents are compressed (e.g., during MRC compression) using the resolution value specified by the user. That further includes using same resolution value (as specified by the user) for the text regions included in the document and using half of the resolution value specified by the user for the image regions included in the document. However, using such methodology for compressing the documents may lead to less optimized file size. Further, the compressed documents may include text regions that are difficult to read. For example, if the font size of the text region in the documents is already small and the user specifies a low resolution value, then the readability of the compressed document may not be proper. In a similar way, if the font size of the content included in the text regions of the document is already quite high, then compressing the document with a high resolution (e.g., if specified by the user) may generate the compressed document that is high in file size. In such a scenario, where the font size is already high, the documents may be compressed using low resolution value such that the file size of the compressed document will be smaller, without compromising on the readability of the document. In the various embodiments of the methods and systems disclosed above, it is disclosed that the resolution for compressing different text regions of the document is determined based on the font size of the respective text regions. In this way, the text regions included in the documents are compressed in a way such that the readability of the text in those text regions is ensured along with the optimum file size of the compressed document.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++', Java, and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for processing the documents have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for processing a document, the method comprising:
    determining, by one or more processors, one or more text regions and one or more image regions in a scanned document;
    determining, by said one or more processors, a font size associated with each of said one or more text regions;
    modifying, by said one or more processors, a first resolution of each of said one or more text regions, based on respective font size associated with each of said one or more text regions to generate one or more modified text regions;
    modifying, by said one or more processors, a second resolution of each of said one or more image regions, based on at least a third resolution provided by a user, to generate one or more modified image regions; and
    generating, by said one or more processors, a multiresolution document based on said one or more modified image regions and said one or more text regions.

2. The method of claim 1, wherein said document corresponds to a printed document.

3. The method of claim 2 further comprising scanning, by said one or more processors, said printed document to obtain said scanned document.

4. The method of claim 1, wherein said document is processed during Mixed Raster Content (MRC) compression of said document.

5. The method of claim 1, wherein said font size associated with each of said one or more text regions is determined based on segmentation methods.

6. The method of claim 1 further comprising determining, by said one or more processors, an expected resolution for each of said one or more text regions, based on a look-up table comprising a mapping between said expected resolution and respective font size.

7. The method of claim 1 further comprising modifying, by said one or more processors, said first resolution of each of said one or more text regions based on a minimum font size associated with said one or more text regions.

8. A system for processing a document, the system comprising:
    one or more processors operable to:
    determine one or more text regions and one or more image regions in a scanned document;
    determine a font size associated with each of said one or more text regions;
    modify a first resolution of each of said one or more text regions, based on respective font size associated with each of said one or more text regions to generate one or more modified text regions;
    modify a second resolution of each of said one or more image regions, based on at least a third resolution provided by a user, to generate one or more modified image regions; and
    generate a multiresolution document based on said one or more modified image regions and said one or more text regions.

9. The system of claim 8, wherein said document corresponds to a printed document.

10. The system of claim 9, wherein said one or more processors are further operable to scan said printed document.

11. The system of claim 8, wherein said document is processed during Mixed Raster Content (MRC) compression of said document.

12. The system of claim 8, wherein said font size associated with each of said one or more text regions is determined based on segmentation methods using connected components.

13. The system of claim 8, wherein said one or more processors are further operable to determine an expected resolution for each of said one or more text regions, based on a look-up table comprising a mapping between said expected resolution and respective font size.

14. The system of claim 8, wherein said one or more processors are further operable to modify said first resolution of each of said one or more text regions based on a minimum font size associated with said one or more text regions.

15. A computer program product for use with a computer, the computer program product comprising a non-transitory computer readable medium, wherein the non-transitory computer readable medium stores a computer program code for processing a document comprising one or more text regions, wherein the computer program code is executable by one or more processors to:

determine one or more text regions and one or more image regions in a scanned document;

determine a font size associated with each of said one or more text regions;

modify a first resolution of each of said one or more text regions, based on respective font size associated with each of said one or more text regions to generate one or more modified text regions;

modify a second resolution of each of said one or more image regions, based on at least a third resolution provided by a user, to generate one or more modified image regions; and generate a multiresolution document based on said one or more modified image regions and said one or more text regions.

16. The method of claim 1 further comprising categorizing, by said one or more processors, said determined font size associated with each of said one or more text regions into one or more categories based on at least a definition of said one or more categories provided by said user.

17. The method of claim 16 wherein said first resolution of each of said one or more text regions is modified based on said one or more categories to generate said one or more modified text regions.

* * * * *